(12) United States Patent
Jung

(10) Patent No.: US 9,778,801 B2
(45) Date of Patent: Oct. 3, 2017

(54) TOUCH WINDOW

(71) Applicant: LG INNOTEK CO., LTD., Seoul (KR)

(72) Inventor: Gwan Youl Jung, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 91 days.

(21) Appl. No.: 14/614,048

(22) Filed: Feb. 4, 2015

(65) Prior Publication Data

US 2015/0220181 A1    Aug. 6, 2015

(30) Foreign Application Priority Data

Feb. 5, 2014  (KR) ........................ 10-2014-0013002

(51) Int. Cl.
| | | |
|---|---|---|
| *G06F 3/045* | (2006.01) | |
| *G06F 3/044* | (2006.01) | |
| *G06F 3/041* | (2006.01) | |

(52) U.S. Cl.
CPC ............ *G06F 3/044* (2013.01); *G06F 3/0412* (2013.01); *G06F 2203/04103* (2013.01); *G06F 2203/04112* (2013.01)

(58) Field of Classification Search
CPC ........... G06F 2203/04103; G06F 3/044; G06F 2203/04112; G06F 3/0412
USPC ......................................................... 345/174
See application file for complete search history.

(56) References Cited

U.S. PATENT DOCUMENTS

| | | | | |
|---|---|---|---|---|
| 2009/0096757 A1* | 4/2009 | Hotelling | ............... | G06F 3/0416 345/173 |
| 2009/0213090 A1* | 8/2009 | Mamba | .................... | G06F 3/044 345/174 |
| 2013/0056342 A1* | 3/2013 | Wang | ...................... | G06F 3/044 200/600 |
| 2013/0153391 A1 | 6/2013 | Liu et al. | | |
| 2013/0278513 A1* | 10/2013 | Jang | ........................ | G06F 3/044 345/173 |
| 2013/0341651 A1 | 12/2013 | Kim et al. | | |
| 2014/0054070 A1 | 2/2014 | Ichiki | | |
| 2014/0152608 A1 | 6/2014 | Peng | | |
| 2014/0184939 A1* | 7/2014 | Lai | ........................ | G06F 1/1692 349/12 |
| 2014/0232959 A1 | 8/2014 | Kuriki | | |
| 2014/0299357 A1 | 10/2014 | Nakamura | | |

(Continued)

FOREIGN PATENT DOCUMENTS

| | | |
|---|---|---|
| DE | 20 2013 100 051 | 3/2013 |
| EP | 2 796 971 | 10/2014 |
| KR | 10-2013-0108220 A | 10/2013 |

(Continued)

OTHER PUBLICATIONS

European Office Action dated Jan. 7, 2016 issued in Application No. 15 153 273.6.

(Continued)

*Primary Examiner* — Adam R Giesy
*Assistant Examiner* — Chineyere Wills-Burns
(74) *Attorney, Agent, or Firm* — KED & Associates, LLP

(57) ABSTRACT

A touch window includes a substrate, a sensing electrode on the substrate, and a dummy electrode in the sensing electrode. The dummy electrode includes first to third dummy electrodes spaced apart from each other.

28 Claims, 15 Drawing Sheets

(56) References Cited

U.S. PATENT DOCUMENTS

2015/0060125 A1   3/2015   Stevenson et al.

FOREIGN PATENT DOCUMENTS

| KR | 10-2013-0118072 A | 10/2013 |
| TW | M470315 U | 1/2014 |
| WO | WO 2012/111819 | 8/2012 |
| WO | WO 2013/062041 A1 | 5/2013 |
| WO | WO 2013/094728 A1 | 6/2013 |

OTHER PUBLICATIONS

European Search Report dated Jun. 5, 2015 issued in Application No. 15153273.6.
European Office Action dated Oct. 14, 2016.

* cited by examiner

TOUCH WINDOW

CROSS-REFERENCE TO RELATED APPLICATION

This application claims priority under 35 U.S.C. §119 to Korean Patent Application No. 10-2014-0013002, filed Feb. 5, 2014, whose entire disclosure is incorporated herein by reference.

BACKGROUND

1. Field

The embodiment relates to a touch window.

2. Background

A touch panel, which performs an input function through the touch of an image displayed on a display device by an input device such as a stylus pen or a finger, has been applied to various electronic appliances. The touch panel may be representatively classified into a resistive touch panel and a capacitive touch panel. The resistive touch panel detects the position of a touch by detecting resistance variance occurring according to the connection between electrodes when pressure is applied by the input device. The capacitive touch panel detects the position of the touch by detecting capacitance variation between the electrodes when the finger is touched on the touch panel. The capacitive touch panel has been spotlighted in a small-model device by taking into consideration the convenience in the manufacturing scheme and a sensing power.

Indium tin oxide (ITO), which is most widely used material for the transparent electrode of the touch panel, is highly priced and may be physically damaged when the substrate is curved and bent, so that the electrode property is deteriorated. Therefore, the indium tin oxide (ITO) may not be suitable for a flexible device. In addition, when the ITO is applied to a large-size touch panel, problems may be caused by high resistance.

In order to solve the problem, researches and studies on an alternative electrode part have been actively carried out. In particular, although the substitute for ITO is formed by making the shape of the mesh using metallic materials. The mesh-pattern may cause the problems related to the visibility or the conduction due to the short between the channels.

Accordingly, there is required a touch window having a novel structure, capable of solving the above problem.

BRIEF DESCRIPTION OF THE DRAWINGS

The embodiments will be described in detail with reference to the following drawings in which like reference numerals refer to like elements wherein.

DETAILED DESCRIPTION

Figure 1:
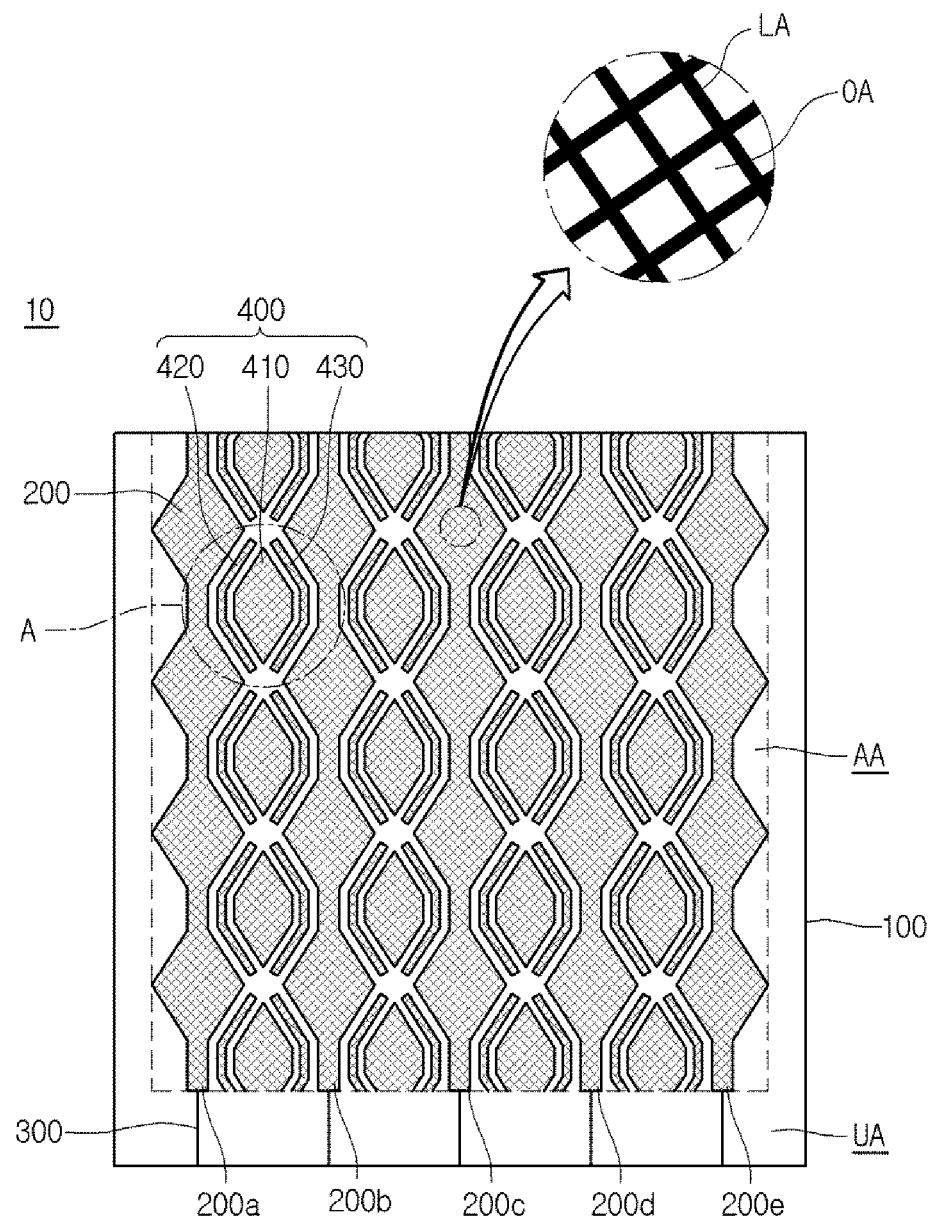
FIG. 1 is a plan view showing a touch window according to the embodiment.
Figure 2:
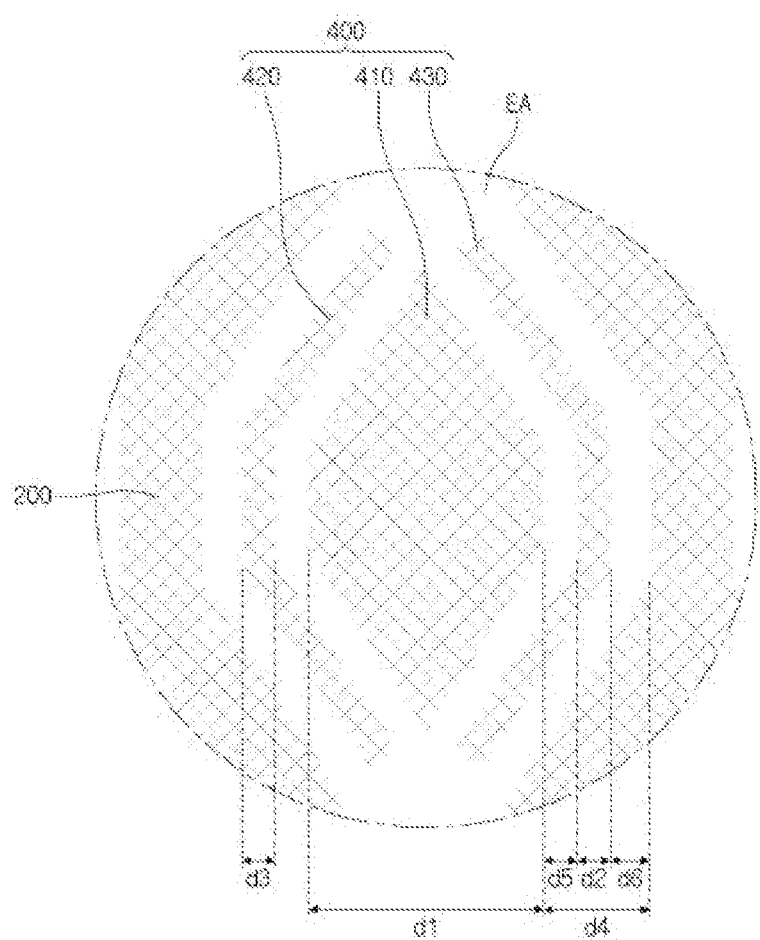
FIG. 2 is an enlarged view showing a part A of FIG. 1.

Referring to FIGS. 1 and 2, a touch window according to the embodiment may include a substrate 100, a sensing electrode 200, a wire electrode 300, and a dummy part 400. The substrate 100 may be rigid or flexible. For example, the substrate 100 may include glass or plastic. In detail, the substrate 100 may include chemically tempered glass, such as soda lime glass or aluminosilicate glass, plastic, such as polyethylene terephthalate (PET) or polyimide (PI), or sapphire.

The sapphire has superior electric characteristics, such as permittivity, so that a touch response speed may be remarkably increased and a space touch such as hovering may be easily implemented. In addition, the sapphire has high surface strength so that the sapphire is applicable to a cover substrate. In this case, the hovering refers to a technology of recognizing coordinates even at a distance slightly spaced apart from a display.

In addition, a portion of the substrate 100 may be curved with a curved surface. In other words, a portion of the substrate 100 may have a flat surface, and another portion of the substrate 100 may be curved with a curved surface. In detail, an end portion of the substrate 100 may be curved with a curved surface or may be curved or bent with a surface having a random curvature.

The substrate 100 may have an active region AA and an unactive region UA defined therein. An image may be displayed in the active region AA. The image is not displayed in the unactive region UA provided at a peripheral portion of the active region AA.

The position of an input device or finger may be sensed in at least one of the active region AA and the unactive region UA. If the input device, or a finger touches the touch window, the variation of capacitance occurs in the touched part by the input device, and the touched part subject to the variation of the capacitance may be detected as a touch point.

The sensing electrode 200 may be provided on the active region AA of the substrate 100. The sensing electrode 200 may extend in one direction on the active region AA of the substrate 100. Although FIG. 1 shows that the sensing electrode 200 extends in one direction on the substrate, the embodiment is not limited thereto. In other words, the sensing electrode 200 may extend in another direction crossing one direction. In addition, the sensing electrode 200 may include two types of sensing electrodes having a shape extending in one direction and a shape extending in another direction.

For example, the sensing electrode 200 may include a transparent conductive material allowing electricity to flow without the interruption of light transmission. For example, the sensing electrode may include a metallic oxide, such as indium tin oxide, indium zinc oxide, copper oxide, tin oxide, zinc oxide, or titanium oxide.

The sensing electrode 200 may include nanowire, photosensitive nanowire film, carbon nanotube (CNT), graphene, or conductive polymer. The sensing electrode 200 may include various metals. For example, the sensing electrode 200 may include at least one of chromium (Cr), nickel (Ni), copper (Cu), aluminum (Al), silver (Ag), molybdenum (Mo), and the alloy thereof. The sensing electrode 200 may be formed in the shape of a mesh. For example, the sensing electrode 200 may include a plurality of sub-electrodes, and the sub-electrodes may be arranged while crossing each other in the shape of a mesh.

Referring to FIG. 1, the sensing electrode 200 may have a mesh line part LA and a mesh opening part OA between mesh lines by the sub-electrodes crossing each other in the shape of a mesh. In this case, the line width of the mesh line part LA may be in the range of about 0.1 μm to about 10 μm.

If the line width of the mesh line part LA is less than about 0.1 μm, the mesh line part LA is impossible in terms of a fabrication process. If the line width of the mesh line part LA exceeds about 10 μm, a sensing electrode pattern is recognized by an outside, so that the visibility may be degraded. Preferably, the line width of the conductive pattern line may be in the range of 0.5 μm to 7 μm. More particularly, the line width of the conductive pattern line may be in the range of 1 μm to 3.5 μm.

The mesh opening part OA may have various shapes. For example, the mesh opening part OA may have a polygonal shape, such as a square shape, a diamond shape, a pentagon shape, or a hexagonal shape, or a circular shape. In addition, the mesh opening part OA may have a regular shape or a random shape.

As the sensing electrode 200 has the shape of a mesh, the pattern of the sensing electrode may not be viewed on the active region, for example a display region. In other words, even if the sensing electrode 200 is formed of metal, the pattern may be not viewed. In addition, even if the sensing electrode is applied to a large-size touch window, the resistance of the touch window may be lowered. The sensing electrode 200 may be formed in the shape of a mesh through various schemes.

Figure 3:
FIGS. 3 to 5 are sectional views to explain a process of forming a sensing electrode according to the embodiment.
Figure 3:
Figure 3:

Referring to FIG. 3, the sensing electrode 200 according to the embodiment may include a mesh-shaped electrode formed by providing a metallic layer M on an entire surface of the substrate 100 and etching the metallic layer M in the shape of a mesh. For example, after depositing the metallic layer M including copper (Cu) on the entire surface of the substrate 100 including polyether terephthalate, the cooper (Cu) layer is etched to form a copper metal mesh electrode having the shape of an embossed mesh.

Figure 4:
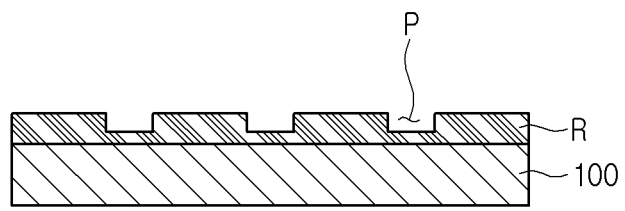
Figure 4:
Figure 4:
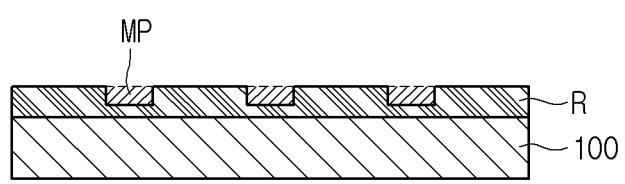

Referring to FIG. 4, in order to form the sensing electrode 200 according to the embodiment, after forming a resin layer (R) including a photocurable resin or thermosetting resin layer on a substrate 100, an intaglio pattern P is formed in the shape of a mesh on the resin layer R, and a metallic paste MP may be filled in the intaglio pattern P. In this case, the intaglio pattern of the resin layer may be formed by imprinting a mold having an emboss pattern.

The metallic paste MP may include at least one of Cr, Ni, Cu, Al, Ag, Mo, and the alloy thereof. After filling the metallic paste MP in the intaglio pattern P having the shape of a mesh, the resultant structure is cured to form the metallic mesh electrode having the shape of the intaglio mesh.

Figure 5:
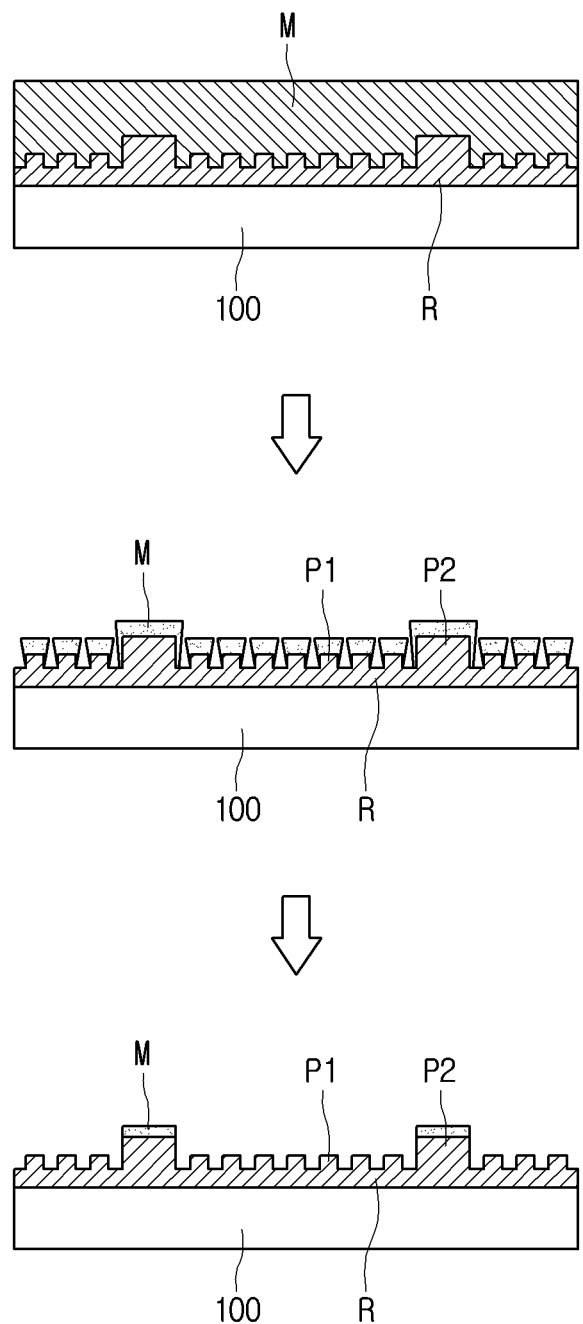

Referring to FIG. 5, in order to form the sensing electrode 200, after forming a resin layer (R) including a photocurable resin or thermosetting resin layer on a substrate 100, an emboss nano-pattern and a micro-pattern having the shape of a mesh are formed on the resin layer R. The metallic layer M including at least one of Cr, Ni, Cu, Al, Ag, Mo, and the alloy thereof may be formed on the resin layer through a sputtering process.

The emboss pattern of the nano-pattern and the micro-pattern may be formed by imprinting a mold having an intaglio pattern. Thereafter, only the metallic layer formed on the nano-pattern is removed and only the metallic layer formed on the micro-pattern remains by etching the metallic layers formed on the nano-pattern and the micro-pattern, so that the metallic electrode having the shape of a mesh may be formed.

When the metallic layers are etched, the difference in the etching rate between the metallic layers may be made due to the difference between a contact area of the nano-pattern P1 and the metallic layer and a contact area of the micro-pattern P2 and the metallic layer. In other words, since the contact area of the micro-pattern and the metallic layer is wider than the contact area of the nano-pattern and the metallic layer, the electrode material layer formed on the micro-pattern is less etched. As the etching process is performed at the same etching rate, the metallic layer formed on the micro-pattern remains, and the metallic layer formed on the nano-pattern P1 is completely etched and removed. Accordingly, the metallic electrode having the shape of an emboss mesh having a micro-pattern may be formed on the substrate 100.

The sensing electrode of the touch window according to the embodiment may include a mesh-shaped electrode including the metallic layer as shown in FIGS. 3 and 5 described above. Although not shown in drawings, the sensing electrode or the wire electrode may be formed by directly coating nano-wires on the substrate 100 or provide a photosensitive base including the nano-wire on the substrate 100.

The wire electrode 300 may be provided on the unactive region UA of the substrate 100. For example, the wire electrode 300 may be connected with the sensing electrode 200 and provided on the unactive region UA of the substrate 100. The wire electrode 300 may include metal having superior electric conductivity. For example, the wire electrode 300 may include a material identical to or similar to that constituting the above-described sensing electrode. A circuit board connected to the wire electrode 300 may be additionally positioned on the unactive region UA of the substrate 100. Various types of printing circuit boards may be applied to the circuit board. For example, a flexible printed circuit board (FPCB) may be applied to the circuit board.

The dummy part 400 may be provided on the active region AA of the substrate 100. For example, the dummy part 400 may be interposed between the sensing electrodes 200. The dummy part 400 may be interposed between the sensing electrodes 200 while being spaced apart from the sensing electrodes 200 by a predetermined distance.

Referring to FIG. 1, sensing electrodes extending in the same direction, for example a vertical direction, may be provided on the substrate 100. For example, the sensing electrode 200 may include a first sub-sensing electrode 200a extending in a first column direction, a second sub-sensing electrode 200b extending in a second column direction, a third sub-sensing electrode 200c extending in a third column direction, a fourth sub-sensing electrode 200d extending in a fourth column direction, and a fifth sub-sensing electrode 200e extending in a fifth column direction.

The dummy part 400 may be interposed between the first sub-sensing electrode 200a and the second sub-sensing electrode 200b, between the second sub-sensing electrode 200b and the third sub-sensing electrode 200c, between the third sub-sensing electrode 200c and the fourth sub-sensing electrode 200d, and between the fourth sub-sensing electrode 200d and the fifth sub-sensing electrode 200e.

Although FIG. 1 shows only a plurality of sensing electrodes extending in a row direction, the embodiment is not limited thereto. The dummy part 400 may be interposed between the sensing electrodes extending in a row direction or may be interposed between the sensing electrodes extending in a row direction and the sensing electrodes extending in a column direction.

The dummy part 400 may include at least two dummy electrodes spaced apart from each other. In detail, the dummy part 400 may include a first dummy electrode 410, a second dummy electrode 420, and a third dummy electrode 4230. The first to third dummy electrodes 410 to 430 may be spaced apart from each other.

Although FIGS. 1 and 2 show that the dummy part 400 includes the first to third dummy electrodes, the embodiment is not limited thereto, and the dummy part may further include a plurality of dummy electrodes such as fourth and fifth dummy electrodes.

The first dummy electrode 410, the second dummy electrode 420, and the third dummy electrode 430 may have the shape of a mesh the same as that of the sensing electrode 200. The sensing electrode 200, the first dummy electrode 410, the second dummy electrode 420, and the third dummy electrode 430 are spaced apart from each other, and the electrodes in the shape of the mesh may be shorted in the space.

The first dummy electrode 410, the second dummy electrode 420, and the third dummy electrode 430 may be provided in shapes different form each other. Although FIGS. 1 and 2 show that the first dummy electrode 410 has a diamond shape, the embodiment is not limited, but the first dummy electrode 410 may have various shapes, such as a rectangular shape, a triangular shape, a circular shape, and a bar shape.

In addition, at least one of the first to third dummy electrodes 410 to 430 may have a shape the same as or similarly to that of the sensing electrode 200. At least one of the second and third dummy electrodes 420 and 430 may surround the first dummy electrode 410. The second and third dummy electrodes 420 and 430 may surround the first dummy electrode 410. At least one of the second and third dummy electrodes 420 and 430 is interposed between the first dummy electrode 410 and the second sensing electrode 200 while surrounding the first dummy electrode 410.

At least one of the second and third dummy electrodes 420 and 430 may have the shape of a bar including a bending part, but the embodiment is not limited thereto. The first dummy electrode 410, the second dummy electrode 420, and the third dummy electrode 430 may have mutually complementary shapes.

The first dummy electrode 410, the second dummy electrode 420, and the third dummy electrode 430 may have mutually different widths. The width of the first dummy electrode 410 may be wider than the width of the second dummy electrode 420 and the width of the third dummy electrode 430.

The width d1 of the first dummy electrode 410 may be about 5 mm or less. The width d1 of the first dummy electrode 410 may be in the range of about 2 mm to about 5 mm. If the width d1 of the first dummy electrode 410 is out of the range of about 2 mm to about 5 mm, sensing electrode patterns provided on the substrate can be recognized through a cover window, so that the visibility may be degraded.

At least one of the width d2 of the second dummy electrode 420 and the width d3 of the third dummy electrode 430 may be about 0.2 mm or less. At least one of the width d2 of the second dummy electrode 420 and the width d3 of the third dummy electrode 430 may be in the range of about 0.1 mm to about 0.2 mm. The width d2 of the second dummy electrode 420 may be equal to or different from the width d3 of the third dummy electrode 430 within the above range.

If at least one of the width d2 of the second dummy electrode 420 and the width d3 of the third dummy electrode 430 is out of the range of about 0.1 mm to about 0.2 mm, short occurs between the first dummy electrode 410 and the sensing electrode 200, so that efficiency may be degraded.

The first to third dummy electrodes 410 to 430 and the sensing electrode 200 may be spaced apart from each other by a predetermined distance. The distance d4 between the first dummy electrode 410 and the sensing electrode 200 may be about 0.3 mm or less. The distance d4 between the first dummy electrode 410 and the sensing electrode 200 may be in the range of about 0.15 mm to about 0.3 mm. If the distance d4 between the first dummy electrode 410 and the sensing electrode 200 is out of the range of about 0.15 mm to about 0.3 mm, the sensing electrode patterns provided on the substrate may be recognized through the cover window, so that the visibility may be degraded.

The distance d5 between the first dummy electrode 410 and at least one of the second and third dummy electrodes 420 and 430 may be about 0.05 mm or less. If the distance d5 between the first dummy electrode 410 and at least one of the second and third dummy electrodes 420 and 430 is out of the range of about 0.002 mm to about 0.05 mm, short may occur between the first dummy electrode 410 and the sensing electrode 200, so that efficiency may be degraded. The distance between the first dummy electrode 410 and the second dummy electrode 420 may be equal to or different from the distance between the first dummy electrode 410 and the third dummy electrode 430 within the above range.

The distance d6 between at least one of the second and third dummy electrodes 420 and 430 and the sensing electrode 200 may be about 0.05 mm or less. For example, the distance d6 between the sensing electrode 200 and at least one of the second and third dummy electrodes 420 and 430 may be in the range of about 0.002 mm to about 0.05 mm. If the distance d6 between the sensing electrode 200 and at least one of the second and third dummy electrodes 420 and 430 is out of the range of about 0.002 mm to about 0.05 mm, short may occur between the first dummy electrode 410 and the sensing electrode 200, so that efficiency may be degraded.

The sensing electrode 200 and the dummy part 400 provided on the active region AA of the substrate 100 may be provided within a predetermined area. The area of the sensing electrode 200 may be in the range of about 40% to about 50% based on the whole area of the active region AA.

The area of the dummy part 400 may be in the range of about 50% to about 60% based on the whole area of the active region AA. In other words, the sum of the areas of the first dummy electrode 310, the second dummy electrode 420, and the third dummy electrode 430 may be in the range of about 50% to about 60% based on the whole area of the active region AA. The area of the sensing electrode 200 may be equal to or different from the area of the dummy part 400.

The sensing electrode 200 and the dummy part 400 are not provided on the active region AA of the substrate 100, but an exposure region EA, which exposes one surface of the substrate 100, may be provided on the active region AA of the substrate 100. An area of the substrate 100 in which the sensing electrode 200 and the dummy part 400 are not provided, that is, the area of the exposure region EA may be about 10% or less based on the whole area of the active region AA. For example, the area of the exposure region EA may be in the range of about 5% to about 10% based on the whole area of the active region AA. The areas of the sensing electrode 200, the dummy part 400, and the exposure region EA may be set by taking into consideration the visibility of the touch window according to the embodiment and the short prevention of the touch window.

The touch window according to the embodiment includes a dummy electrode on the active region of the substrate. In other words, the touch window according to the embodiment includes a dummy electrode provided between the sensing electrodes provided on the active region of the substrate. The dummy electrode may include the first dummy electrode interposed between the sensing electrodes, and the second and third dummy electrodes interposed between the first dummy electrode and the sensing electrode.

As the first dummy electrodes are provided between the sensing electrodes, the sensing electrodes provided on the active region of the substrate can be prevented from being recognized from the outside. In other words, the touch window according to the embodiment includes a dummy electrode provided at an area without the sensing electrodes and having the shape of a mesh. Accordingly, the optical characteristics of the sensing electrode and the substrate are different from each other, so that the sensing electrode can be prevented from being recognized from the outside. Therefore, the whole visibility of the touch window can be improved.

The touch window according to the embodiment may further include the second and third dummy electrodes between the first dummy electrode and the sensing electrode. In other words, the touch window according to the embodiment further includes the second and third dummy electrodes spaced apart from the first dummy electrode and the sensing electrode.

The short between the sensing electrode and the dummy electrode can be prevented from being shorted due to a fine gap between the sensing electrode and the dummy electrode. The visibility of the touch window can be improved by the first to third dummy electrodes. The reliability of the touch window can be also improved by the second and third dummy electrodes.

Figure 6:
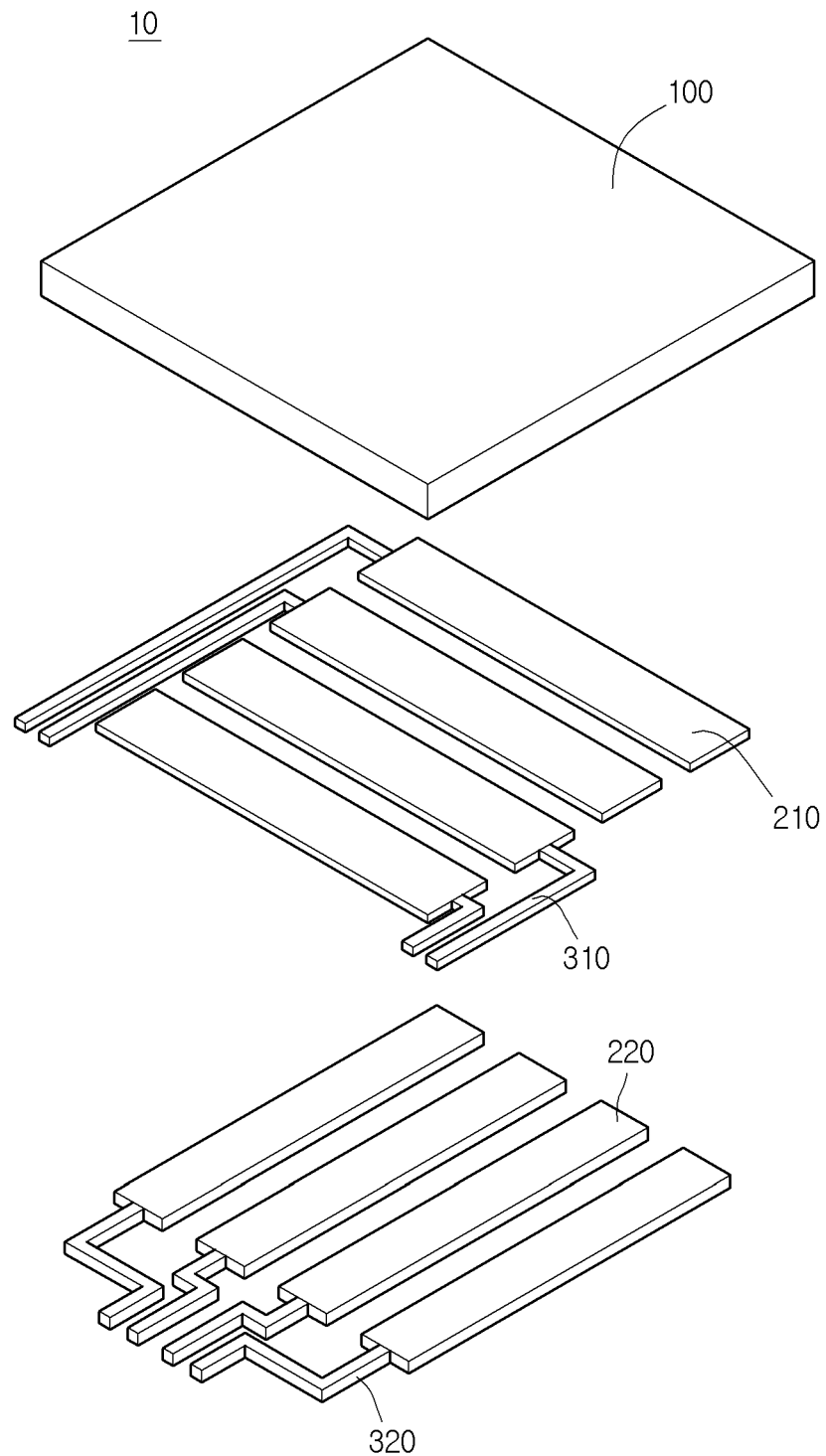
FIGS. 6 to 11 are views showing various types of touch windows.

Referring to FIG. 6, a touch window 10 according to the embodiment may include a substrate 100 and first and second sensing electrodes 210 and 220 provided on the substrate 100.

The substrate 100 may include a cover substrate. The substrate 100 is provided on one surface thereof with the first and second sensing electrodes 210 and 220 extending in directions different from each other, and first and second wire electrodes 310 and 320 connected to the first and second sensing electrodes, respectively. The first and second sensing electrodes may be insulated from each other on the same plane of the substrate 100. At least one of the first and second sensing electrodes 210 and 220 may have the shape of a mesh, and may include the above-described dummy parts. Since the dummy part is similar to the dummy part that has been described above, the details thereof will be omitted.

Figure 7:
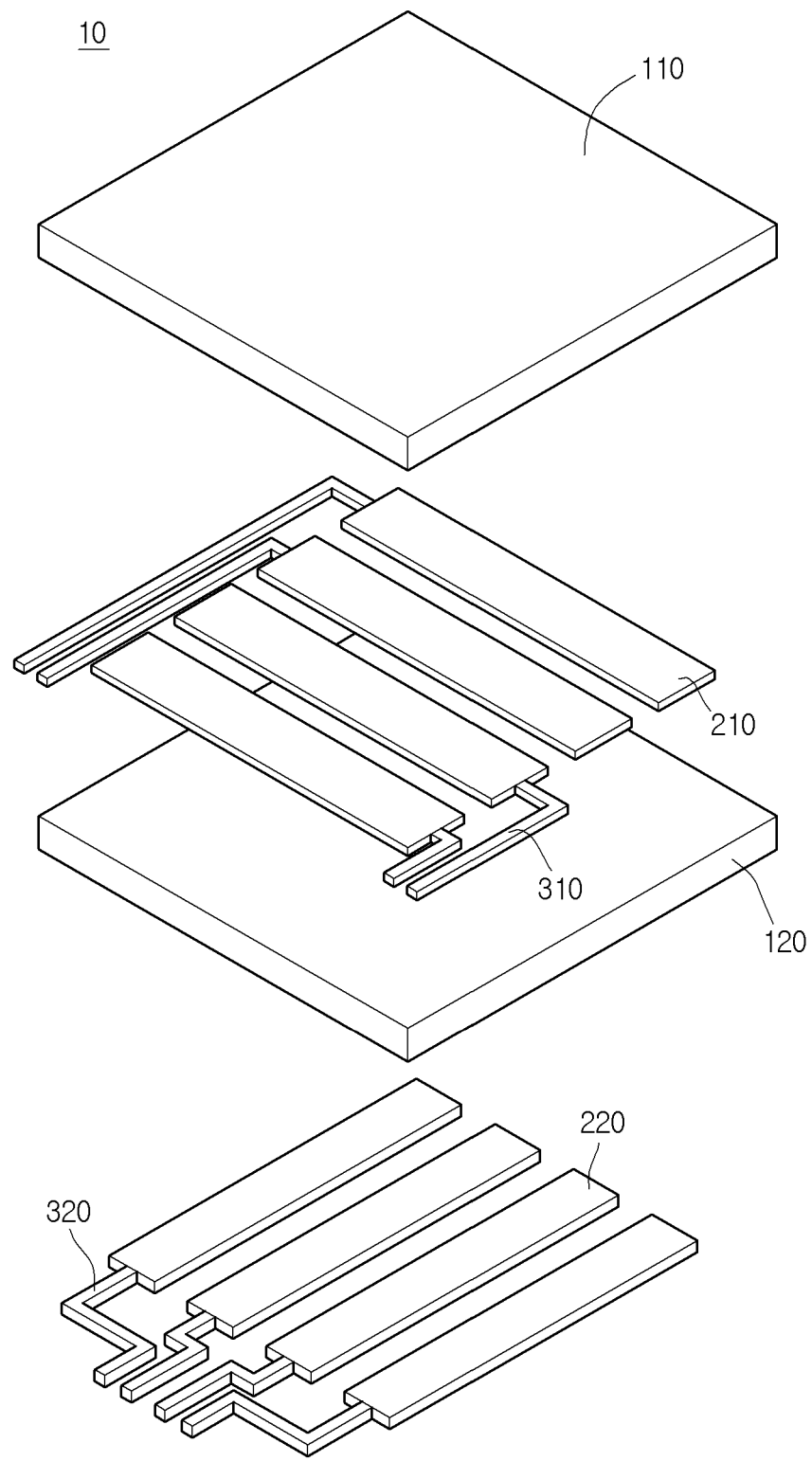

Referring to FIG. 7, the touch window 10 according to the embodiment may include first and second substrates 110 and 120, and the first sensing electrode on the first substrate 110 and the second sensing electrode on the second substrate 120.

The first substrate 110 is provided on one surface thereof with the first sensing electrode 210 extending in one direction and the first wire electrode 310 connected with the first sensing electrode 210. The second substrate 120 is provided on one surface thereof with the second sensing electrode 220 extending in a direction different from one direction and a second wire electrode 320 connected with the second sensing electrode 220.

The first substrate 110 may include a cover substrate. The first substrate 110 may be bonded to the second substrate 120 by an optically clear adhesive (OCA).

At least one of the first and second sensing electrodes 210 and 220 may have the shape of a mesh, and the above-described dummy parts. Since the dummy part is similar to the dummy part that has been described above, the details thereof will be omitted.

Figure 8:
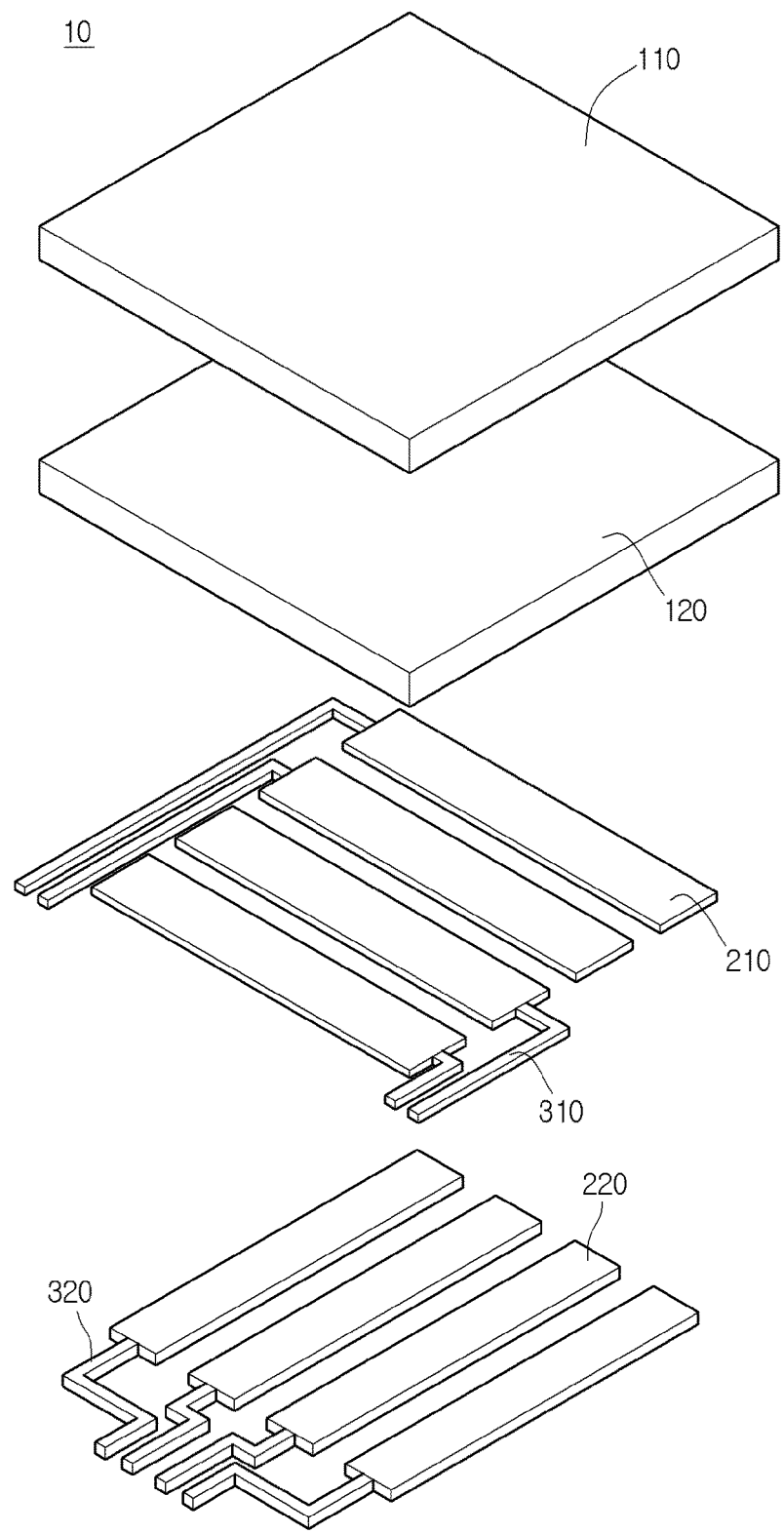

Referring to FIG. 8, the touch window 10 according to the embodiment may include first and second substrates 110 and 120, and the first and second sensing electrodes 210 and 220 on the second substrate 120.

The second substrate 120 is provided on one surface thereof with the first and second sensing electrodes extending in mutually different directions. The first and second sensing electrodes 210 and 220 may be insulated from each other on the same plane. The first substrate 110 may include a cover substrate. In addition, the first substrate 110 may be bonded to the second substrate 120 by an optically clear adhesive (OCA).

At least one of the first and second sensing electrodes 210 and 220 may have the shape of a mesh, and the above-described dummy parts. Since the dummy part is similar to the dummy part that has been described above, the details thereof will be omitted.

Figure 9:
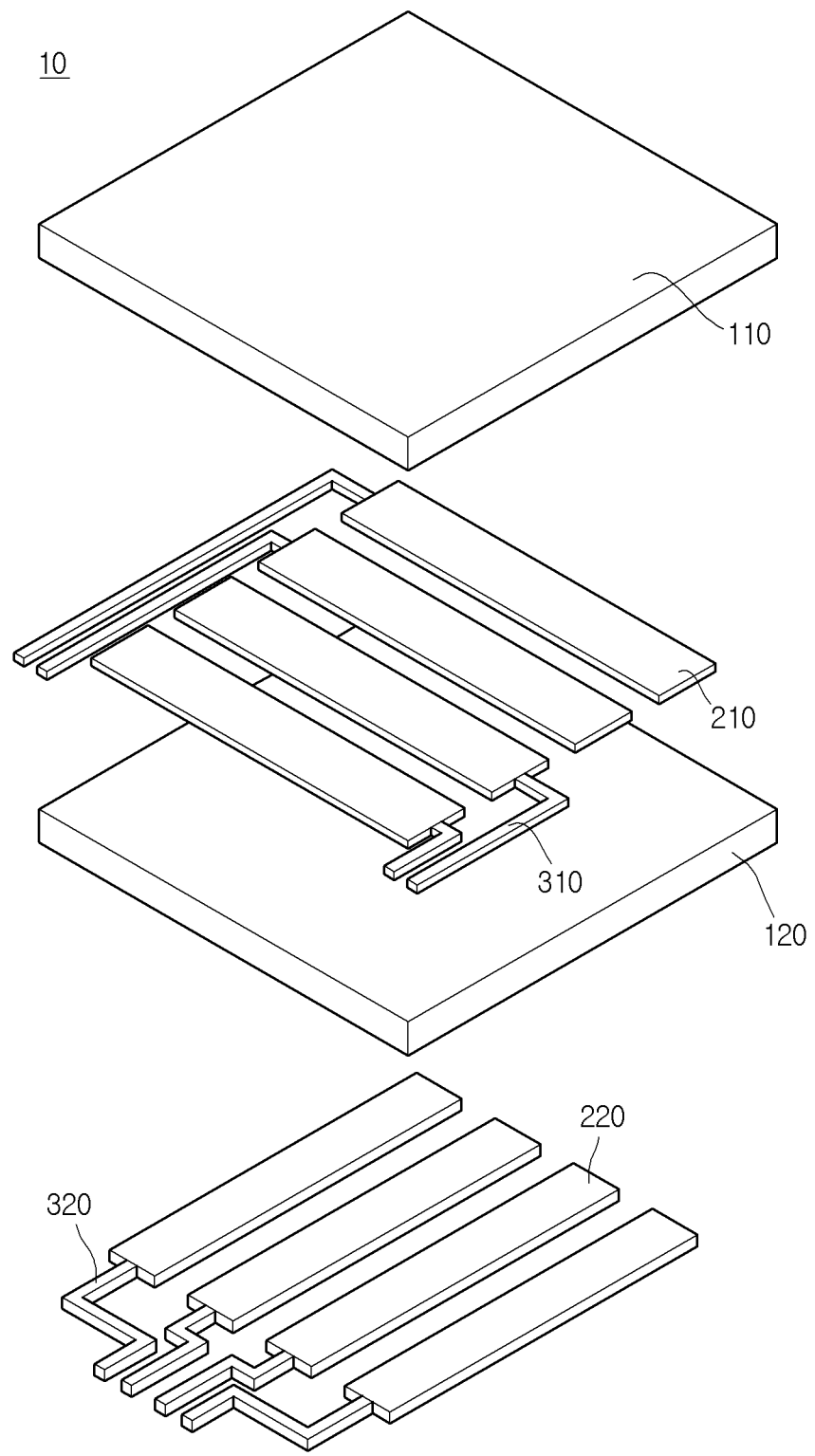

Referring to FIG. 9, the touch window 10 according to the embodiment may include the first and second substrates 110 and 120, and the first and second sensing electrodes on the second substrate 120.

The second substrate 120 is provided on one surface thereof with the first sensing electrode 210 extending in one direction and the first wire electrode 310 connected with the first sensing electrode 210. The second substrate 120 is provided on another surface thereof, that is, a surface opposite to the one surface thereof with the second sensing electrode 220 extending in a direction different from one direction and the second wire electrode 320 connected with the second sensing electrode 220.

The first substrate 110 may include a cover substrate. The first substrate 110 may be bonded to the second substrate 120 by an optically clear adhesive (OCA).

At least one of the first and second sensing electrodes 210 and 220 may have the shape of a mesh, and the above-described dummy parts. Since the dummy part is similar to the dummy part that has been described above, the details thereof will be omitted.

Figure 10:
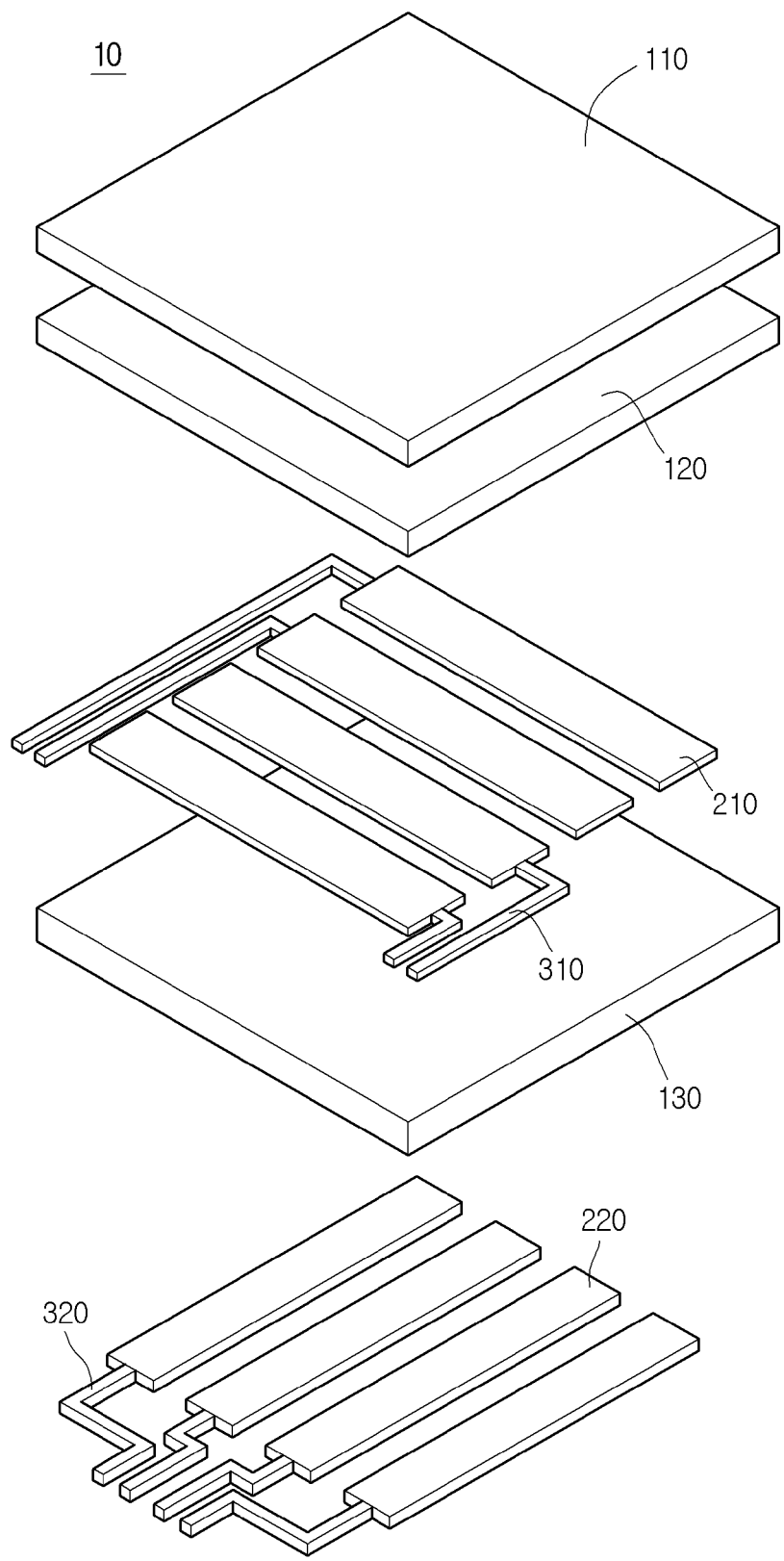

Referring to FIG. 10, the touch window 10 according to the embodiment may include a first substrate 110, a second substrate 120, and a third substrate 130, and may include the first sensing electrode on the second substrate 120 and the second sensing electrode on the third substrate 130.

The second substrate 120 is provided on one surface thereof with the first sensing electrode 210 extending in one direction and a first wire electrode 310 connected to the first sensing electrode 210. The third substrate 130 is provided on one surface thereof with the second sensing electrode 220 extending in a direction different from the one direction and the second wire electrode 320 connected to the second sensing electrode 220.

The first substrate 110 may include a cover substrate. The first substrate 110, the second substrate 120, and the third substrate 130 may be bonded to each other by an optically clear adhesive (OCA). At least one of the first and second sensing electrodes 210 and 220 may have the shape of a mesh, and the above-described dummy parts. Since the dummy part is similar to the dummy part that has been described above, the details thereof will be omitted.

Figure 11:
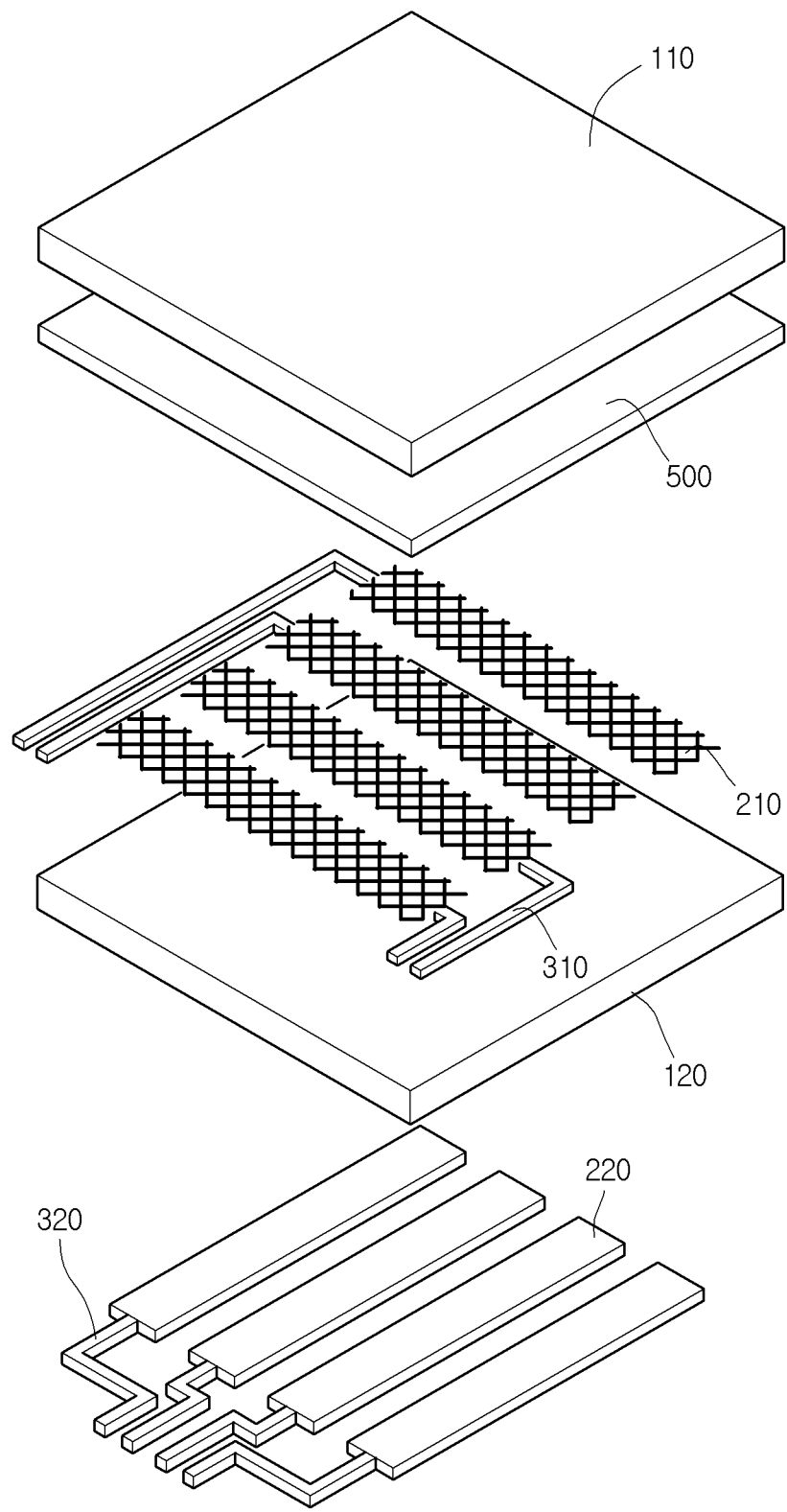

Referring to FIG. 11, the touch window 10 according to the embodiment may include a first substrate 110, a second substrate 120, and a dielectric layer 500, and may include the first sensing electrode 210 on the second substrate 120 and the second sensing electrode 220 on the dielectric layer 500.

The second substrate 120 is provided on one surface thereof with the first sensing electrode 210 extending in one direction and a first wire electrode 310 connected to the first sensing electrode 210. The dielectric layer 500 is provided on one surface thereof with the second sensing electrode 220 extending in a direction different from the one direction and the second wire electrode 320 connected to the second sensing electrode 220.

For example, the dielectric layer 500 may include an insulator group including halogen compound of alkali metal or alkali earth metal, such as LiF, KCl, $CaF_2$, or $MgF_2$, or fused silica, such as $SiO_2$, or SiNX; a semiconductor group including InP or InSb; transparent oxide used for semiconductor or dielectric substance including In compound, such as ITO or IZO, mainly used for a transparent electrode, or transparent oxide used for semiconductor or dielectric substance, such as ZnOx, ZnS, ZnSe, TiOx, WOx, MoOx, or ReOx; an organic semiconductor group including $Alq_3$, NPB, TAPC, 2TNATA, CBP or Bphen; and a low-K material such as silsesquioxane or a derivative (($H—SiO_{3/2}$)n) thereof, methylsilsesquioxane ($CH_3—SiO_{3/2}$)n), porous silica or porous silica doped with fluorine or carbon atoms, porous zinc oxide (ZnOx), cyclized-perfluoropolymer (CYTOP) or a mixture thereof.

The dielectric layer 500 may have about 75% to about 99% of the transmittance of a visible ray.

The thickness of the dielectric layer 500 may be thinner than the thicknesses of the first substrate 110 and/or the second substrate 120. The thickness of the dielectric layer 500 may be about 0.01 times to about 0.1 times of the thickness of the first substrate 110 and/or the second substrate 120. For example, the thickness of the first substrate 110 and/or the second substrate 120 may be about 0.1 mm, and the thickness of the dielectric layer 500 may be about 0.001 mm.

The touch window shown in FIG. 11 may have a thickness thinner than the thickness of a background structure in which two substrates are provided. In particular, the dielectric layer may be substituted for one substrate and an adhesive layer, so that the touch window having a thin thickness can be ensured.

According to the related art, an OCA is additionally required between substrates in a structure in which two substrates are stacked on each other. However, according to the touch window, one substrate is used and the sensing electrode is directly formed on the dielectric layer, so that the OCA may be omitted. Therefore, the cost may be reduced, and the touch window having a thin thickness is ensured through the dielectric so that the transmittance may be improved.

The first substrate 110 may be a cover substrate. At least one of the first and second sensing electrodes 210 and 220 may have the shape of a mesh, and may include the above-described dummy parts. Since the dummy part is similar to the dummy part that has been described above, the details thereof will be omitted.

Figure 12:
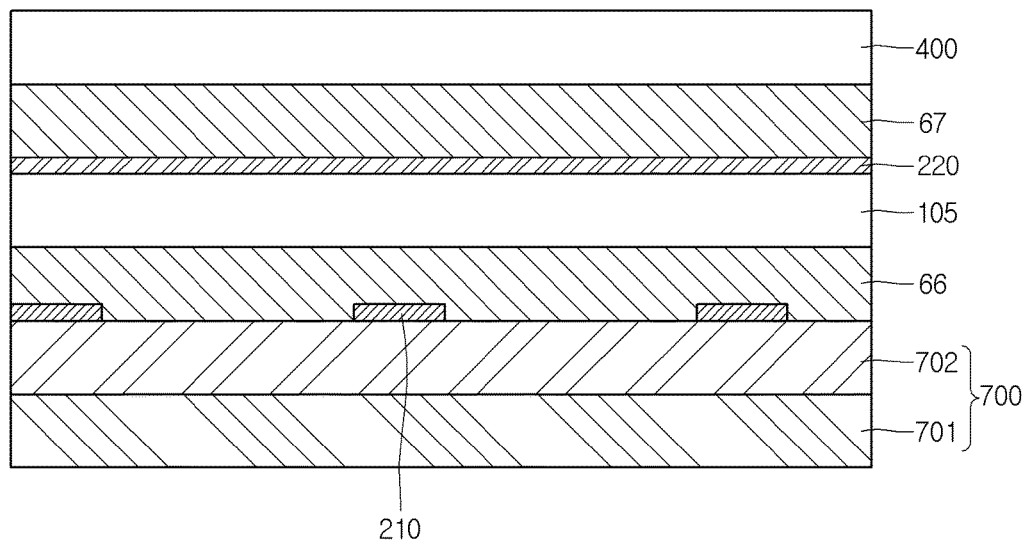
FIGS. 12 to 17 are sectional views showing various types of touch devices in which the touch window according to the embodiment is assembled with the display panel.
Figure 13:
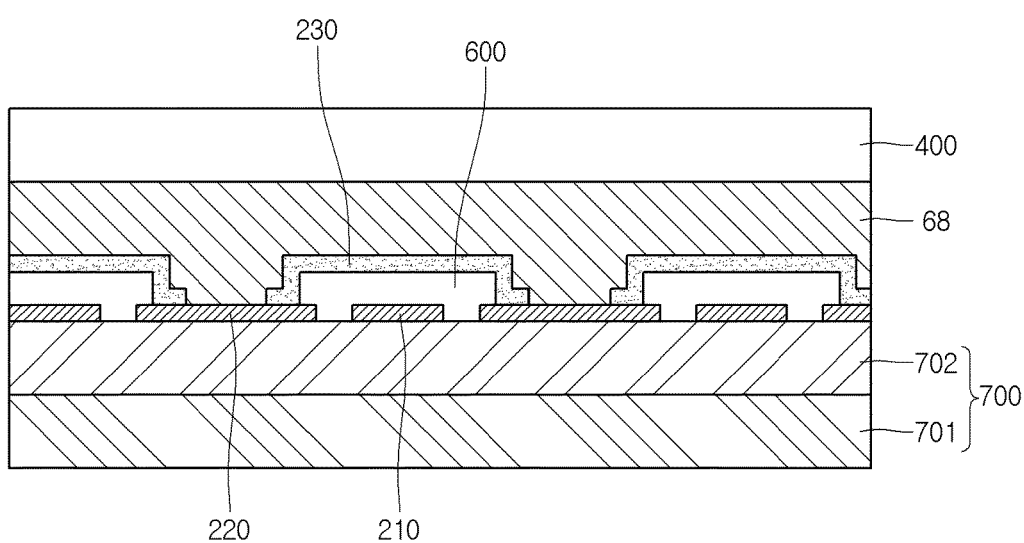

Referring to FIGS. 12 and 13, a touch device according to another embodiment may include a touch window which is formed integrally with a touch panel 700. In other words, a substrate supporting at least one sensing electrode may be omitted. At least one sensing electrode may be formed on at least one surface of the display panel 700. The display panel 700 includes first and second substrates 701 and 702. That is, at least one sensing electrode may be formed on at least one surface of the first or second substrate 701 or 702. When the display panel 700 is a liquid crystal panel, the display device may further include a backlight unit to provide light on the rear surface of the display panel 700.

When the display panel 700 is a liquid crystal display panel, the display panel 700 may be formed in a structure where the first substrate 701 including a thin film transistor (TFT) and a pixel electrode and the second substrate 702 including color filter layers are combined with each other while interposing a liquid crystal layer therebetween.

The display panel 700 may be a liquid crystal display panel having a COT (color filter on transistor) structure in which the second substrate 702 is combined with the first substrate 701 on which a thin film transistor, a color filter and a black matrix are formed while a liquid crystal layer is interposed between the first and second substrates 701 and 702. In other words, the thin film transistor may be formed on the first substrate 701, the protective layer may be formed on the thin film transistor, and the color filter layer may be formed on the protective layer. A pixel electrode making contact with the thin film transistor is formed on the first substrate 701. In order to improve an aperture rate and simplify a mask process, the black matrix may be omitted and a common electrode may be formed to have the function of the black matrix.

When the display panel 700 is an organic light emitting device, the display panel 700 includes a self light-emitting device which does not require any additional light source. The display panel 700 includes a thin film transistor formed on the first substrate 701, and an organic light-emitting device (OLED) making contact with the thin film transistor is formed. The OLED may include an anode, a cathode and an organic light-emitting layer formed between the anode and the cathode. In addition, the display panel 700 may further include the second substrate 702, which performs the function of an encapsulation substrate for encapsulation, on the OLED.

At least one sensing electrode may be formed on a top surface of an upper substrate. Although drawings show that the sensing electrode is formed on a top surface of the second substrate 702, if the first substrate 701 serves as the upper substrate, at least one sensing electrode may be formed on the top surface of the first substrate 701.

Referring to FIG. 12, the first sensing electrode 210 may be formed on the top surface of the display panel 700. The first wire connected with the first sensing electrode 210 may be formed. The touch substrate 105, on which the second sensing electrode 220 and the second wire are formed, may be formed on the display panel 700 on which the first sensing electrode 210 is formed. A first adhesive layer 66 may be formed between the touch substrate 105 and the display panel 700.

Although the second sensing electrode 220 formed on the top surface of the touch substrate 105 and the cover substrate 400 provided on the touch substrate while a second adhesive layer 67 is interposed between the touch substrate 105 and the cover substrate 400 are shown in the drawings, the embodiment is not limited thereto. The second sensing electrode 220 may be formed on a rear surface of the touch substrate 105. In this case, the touch substrate 105 may serve as the cover substrate.

In other words, the embodiment is not limited to the drawings, but various configurations are possible if the first sensing electrode 210 is formed on the top surface of the display panel 700, the touch substrate 105 to support the second sensing electrode 220 is provided on the display panel 700, and the touch substrate 105 is combined with the display panel 700.

The touch substrate 105 may be a polarizing plate. In other words, the second electrode 220 may be formed on a top or rear surface of the polarizing plate. Accordingly, the second sensing electrode and the polarizing plate may be formed integrally with each other.

A polarizing plate may be further provided separately from the touch substrate 105. In this case, the polarizing plate may be provided under the touch substrate 105. For example, the polarizing plate may be interposed between the touch substrate 105 and the display panel 700. The polarizing plate may be provided on the touch substrate 105.

The polarizing plate may be a linear polarizing plate or an anti-reflection polarizing plate. For example, when the display panel 700 is a liquid crystal display panel, the polarizing plate may be a linear polarizing plate. When the display panel 700 is an organic electroluminescent display panel, the polarizing plate may be an anti-reflection polarizing plate.

Referring to FIG. 13, the first and second sensing electrodes 210 and 220 may be formed on the top surface of the display panel 700. The first wire connected with the first sensing electrode 210 and the second wire connected with the second sensing electrode 220 may be formed on the top surface of the display panel 700. An insulating layer 600 may be formed on the first sensing electrode 210 to expose the second sensing electrode 220. A bridge electrode 230 may be further formed on the insulating layer 600 for the connection with the second sensing electrodes 220.

The embodiment is not limited to the drawings. The first sensing electrode 210 and the first and second wires may be formed on the top surface of the display panel 700, and the insulating layer may be formed on the first sensing electrode 210 and the first wire. The second electrode 220 may be formed on the insulating layer, and a connecting part to connect the second sensing electrode 220 with the second may be further included.

The first and second sensing electrodes 210 and 220 and the first and second wires may be formed on the top surface of the display panel 700 in the active region. The first and second sensing electrodes 210 and 220 may be spaced apart from each other adjacent to each other. In other words, the insulating layer and the bridge electrode may be omitted. The embodiment is not limited to the drawings, and various configurations are possible if the first and second sensing electrodes 210 and 220 are formed on the display panel 70 without any additional substrate to support the sensing electrodes.

The cover substrate 400 may be disposed on the display panel 700 while an adhesive layer 68 is interposed between the cover substrate 400 and the display panel 700. A polarizing plate may be provided between the display panel 700 and the cover substrate 400. In the touch device according to the embodiment, at least one substrate to support the sensing electrode may be omitted. Accordingly, a thin and light touch device can be formed.

Referring to FIGS. 14 to 17 a touch device according to the present embodiment may include a touch window formed integrally with a display panel. In other words, a substrate to support at least one sensing electrode may be omitted. All substrates to support sensing electrodes may be omitted. A sensing electrode, which serves as a sensor provided in an active region to sense a touch, and a wire to apply an electrical signal to the sensing electrode may be formed inside the display panel. In detail, at least one sensing electrode or at least one wire may be formed inside the display panel.

The display panel includes first and second substrates 701 and 702. In this case, at least one of the first and second sensing electrodes 210 and 220 is interposed between the first and second substrates 701 and 702. In other words, at least one sensing electrode may be formed on at least one surface of the first or second substrate 701 or 702.

Figure 14:
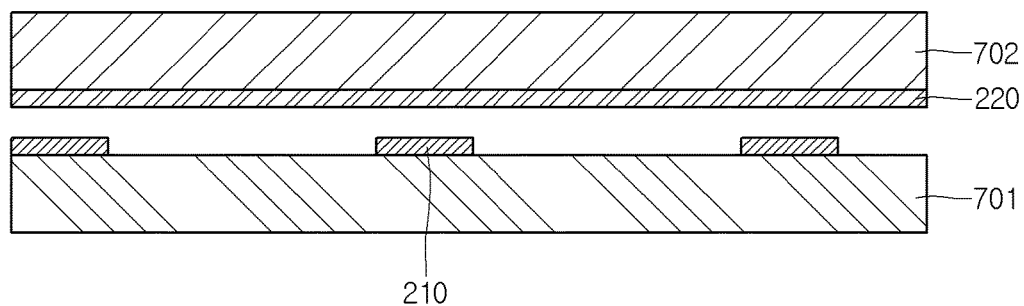
Figure 16:
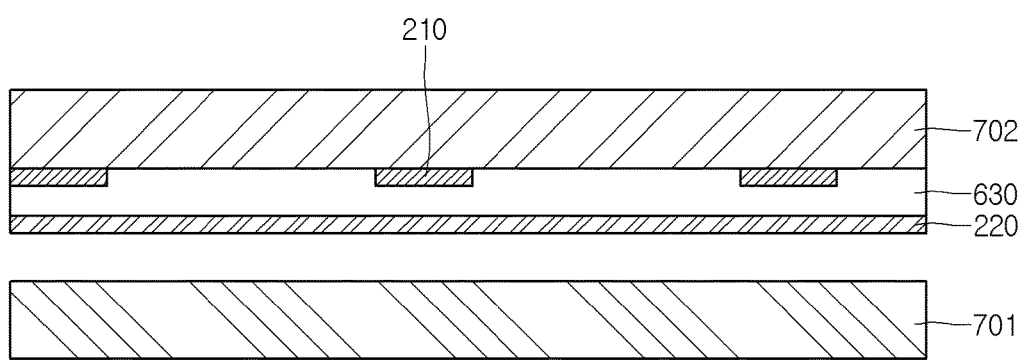

Referring to FIGS. 14 and 16, the first and second sensing electrodes 210 and 220 and the first and second wires may be provided between the first and second substrates 701 and 702. In other words, the first and second sensing electrodes 210 and 220 and the first and second wires may be provided inside the display panel.

Figure 15:
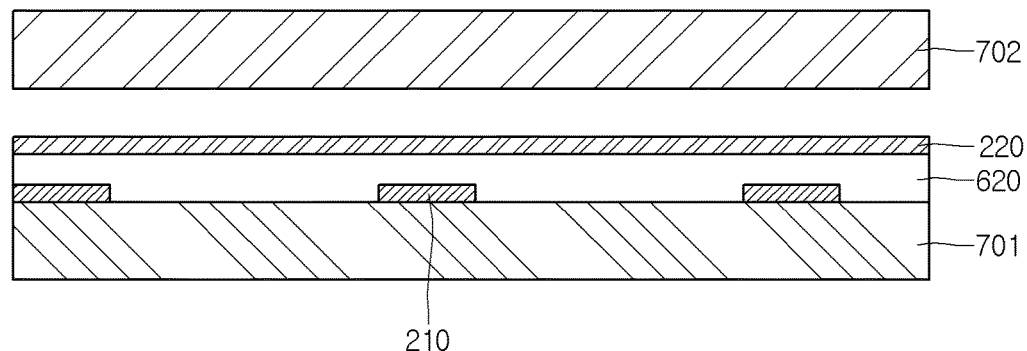

Referring to FIG. 14, the first sensing electrode 210 and the first wire may be formed on the top surface of the first substrate 710 of the display panel, and the second sensing electrode 220 and the second wire may be formed on a rear surface of the second substrate 702. Referring to FIG. 15, the first and second sensing electrodes 210 and 220 and the first and second wires may be formed on the top surface of the first substrate 701. An insulating layer 620 may be formed between the first and second sensing electrodes 210 and 220. Referring to FIG. 16, the first and second sensing electrodes 210 and 220 may be formed on the rear surface of the second substrate 702. An insulating layer 630 may be formed between the first and second sensing electrodes 210 and 220.

Figure 17:
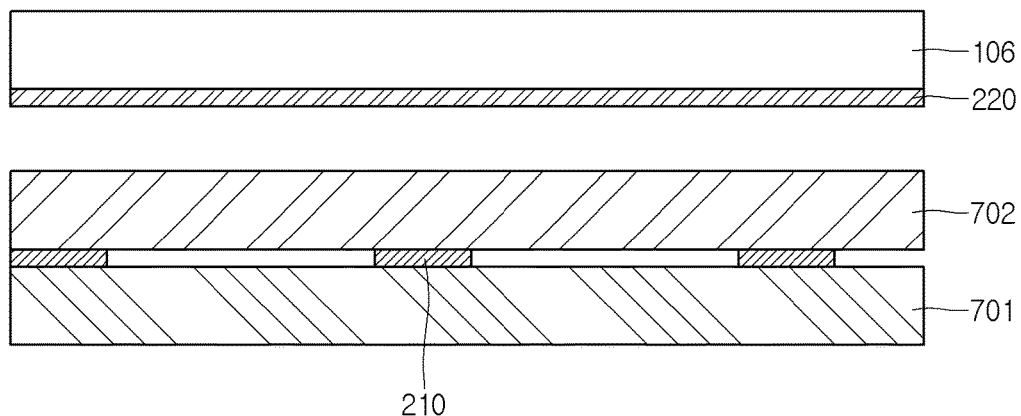

Referring to FIG. 17, the first sensing electrode 210 and the first wire may be formed between the first and second substrates 701 and 702. The second sensing electrode 220 and the second wire may be formed on the touch substrate 106. The touch substrate 106 may be provided on the display panel including the first and second substrates 701 and 702. In other words, the first sensing electrode 210 and the first wire may be provided inside the display panel, and the second sensing electrode 220 and the second wire may be disposed outside the display panel.

The first sensing electrode 210 and the first wire may be formed on the top surface of the first substrate 701 or the rear surface of the second substrate 702. The adhesive layer may be formed between the touch substrate 106 and the display panel. In this case, the touch substrate 106 may serve as the cover substrate.

Although the configuration of forming the second sensing electrode 220 on the rear surface of the touch substrate 106 is shown in the drawings, the embodiment is not limited thereto. The second sensing electrode 220 may be formed on the top surface of the touch substrate 106, and the cover substrate may be further formed while being interposed between the touch substrate 106 and the adhesive layer. In other words, the embodiment is not limited to the drawings, but various configurations are possible if the first sensing electrode 210 and the first wire are provided inside the display panel and the second electrode 220 and the second wire are disposed outside the display panel.

The touch substrate 106 may be a polarizing plate. That is, the second sensing electrode 220 may be formed on the top or rear surface of the polarizing plate, and the second sensing electrode may be formed integrally with the polarizing plate.

The polarizing plate may be further provided without regard to the touch substrate 106. The polarizing plate may be disposed below the touch substrate 106. For example, the polarizing plate may be interposed between the touch substrate 106 and the display panel. The polarizing plate may be disposed on the touch substrate 106.

When the display panel is a liquid crystal display panel and the sensing electrode is formed on the top surface of the first substrate 701, the sensing electrode may be formed together with a thin film transistor (TFT) and a pixel electrode. In addition, when the sensing electrode is formed on the rear surface of the second substrate 702, a color filter layer may be formed on the sensing electrode or the sensing electrode may be formed on the color filter layer. When the display panel is an organic light emitting device and the sensing electrode is formed on the top surface of the first substrate 701, the sensing electrode may be formed together with a thin film transistor or an organic light emitting device.

In the touch device according to the embodiment, at least one substrate to support the sensing electrode may be omitted. Accordingly, a thin and light touch device can be formed. In addition, the sensing electrode and the wire are formed together with devices formed on the display panel, so that the manufacturing process can be simplified, and the cost can be reduced.

Hereinafter, examples of a touch device to which the touch window according to the previous embodiment described above is applied will be described with reference to FIGS. 18 to 21.

Figure 18:
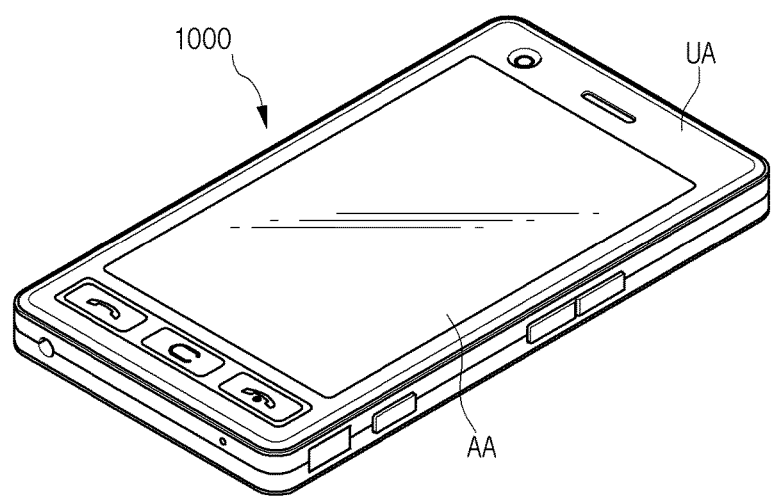
FIGS. 18 to 21 are views showing examples of a touch device employing the touch window according to the embodiment.

Referring to FIG. 18, as an example of the touch device, a mobile terminal 1000 is shown. The mobile terminal 1000 may include an active region AA and an unactive region UA. A touch signal by the touch of the finger is sensed in the active region AA, and an instruction icon pattern part and a logo may be formed in the unactive region.

Figure 19:
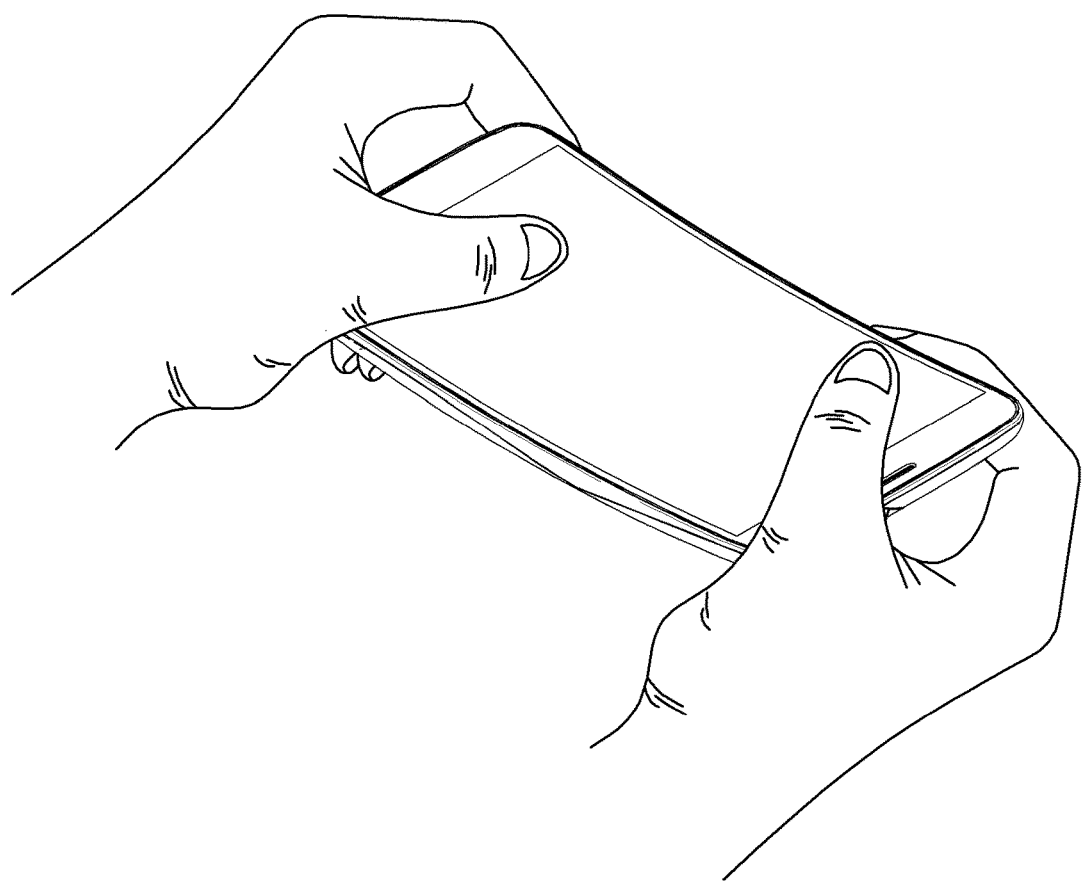

Meanwhile, referring to FIG. 19, the touch window may include a flexible touch window. Accordingly, the display device including the flexible touch window may be a flexible touch device. Therefore, a user may curve or bend the touch device with the hand of the user.

Figure 20:
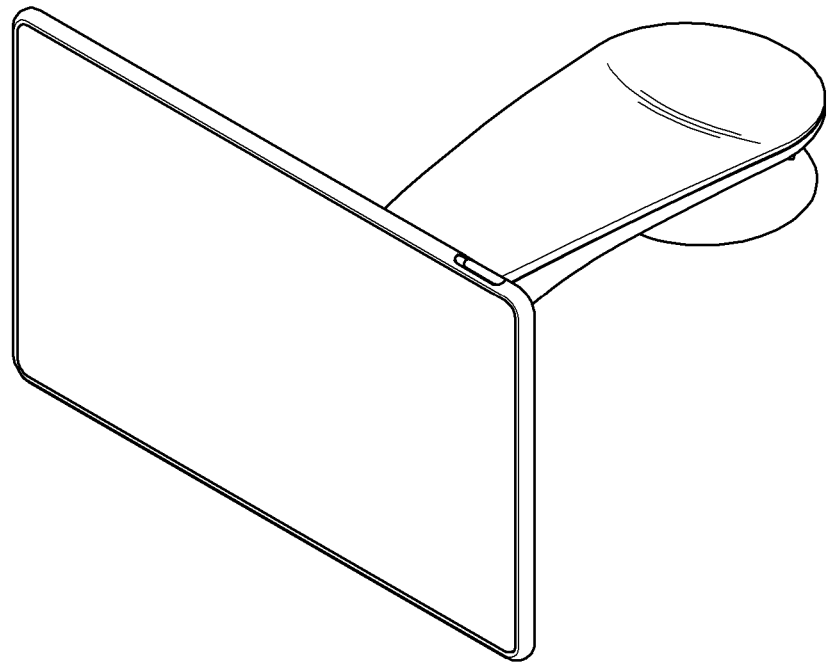
Figure 21:

Referring to FIG. 20, the touch window may be applied to a vehicle navigation system as well as a mobile terminal. In addition, referring to FIG. 21, the touch panel may be applied to an inside of a vehicle. In other words, the touch panel may be applied to various parts allowing the application of the touch panel in the vehicle. Accordingly, the touch window is applied to a dashboard as well as a PND (Personal Navigation Display) so that a CID (Center Information Display) may be implemented. However, the embodiment is not limited thereto, but the touch device may be used for various electronic products.

The embodiment provides a touch window having an improved reliability.

According to the embodiment, there is provided a touch window including a substrate, a sensing electrode on the substrate, and a dummy electrode in the sensing electrode. The dummy electrode includes first to third dummy electrodes spaced apart from each other.

The touch window according to the embodiment includes the dummy electrode on an active region of the substrate. In other words, the touch window includes the dummy electrode provided between the sensing electrodes provided on the active region of the substrate.

The dummy electrode includes first to third dummy electrodes. In other words, the dummy electrode includes a first dummy electrode interposed between the sensing electrodes and the second and third dummy electrodes interposed between the first dummy electrode and the sensing electrode.

The first dummy electrodes are provided between the sensing electrodes to prevent the sensing electrodes provided on the active region of the substrate from being viewed from the outside. In other words, according to the touch window of the embodiment, the dummy electrode is provided in the shape of a mesh in a region in which the sensing electrodes are not provided. Therefore, the optical characteristics of the sensing electrode and the substrate are different from each other, so that the sensing electrode can be prevented from being recognized from the outside. Therefore, the whole visibility of the touch window can be improved.

The touch window according to the embodiment further includes the second and third dummy electrodes interposed between the first dummy electrode and the sensing electrode. In other words, the touch window further includes the second and third dummy electrodes spaced apart from both of the first dummy electrode and the sensing electrode.

The short between the sensing electrode and the dummy electrode can be prevented due to the fine gap between the sensing electrode and the dummy electrode.

According to the touch window of the embodiment, the reliability of the touch window can be improved by the first to third dummy electrodes. In addition, the reliability of the touch window can be improved by the second and third dummy electrodes.

It will be understood that, when a layer (or film), a region, a pattern, or a structure is referred to as being "on" or "under" another substrate, another layer (or film), another region, another pad, or another pattern, it can be "directly" or "indirectly" on the other substrate, layer (or film), region, pad, or pattern, or one or more intervening layers may also be present. Such a position of the layer has been described with reference to the drawings.

When a part is connected to the other part, the parts are not only directly connected to each other, but also electrically connected to each other while interposing another part therebetween. In the following description, when a predetermined part "includes" a predetermined component, the predetermined part does not exclude other components, but may further include other components unless the context clearly indicates otherwise.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A touch window comprising:
   a substrate;
   first and second sensing electrodes over the substrate, the first and second sensing electrodes spaced apart from each other; and
   a dummy electrode provided between the first and second sensing electrodes, wherein the dummy electrode includes a first dummy electrode, a second dummy electrode, and a third dummy electrode spaced apart from each other,
   wherein at least one of the first or second sensing electrodes are formed integrally, wherein the first dummy electrode is provided between the second dummy electrode and third dummy electrode, and wherein the first sensing electrode, the second sensing electrode and the dummy electrode are provided directly on a same surface of the substrate.

2. The touch window of claim 1, wherein the second and third dummy electrodes are provided at opposite sides of the first dummy electrode.

3. The touch window of claim 2, wherein the first dummy electrode has a width in a range of 2 mm to 5 mm.

4. The touch window of claim 2, wherein the first dummy electrode is spaced apart from the first sensing electrode or the second sensing electrode by a width in a range of 0.15 mm to 0.3 mm.

5. The touch window of claim 2, wherein the first dummy electrode is spaced apart from at least one of the second dummy electrode or the third dummy electrode by a width in a range of 0.002 mm to 0.05 mm.

6. The touch window of claim 1, wherein at least one of the second dummy electrode or the third dummy electrode has a width in a range of 0.1 mm to 0.2 mm.

7. The touch window of claim 1, wherein at least one of the second dummy electrode or the third dummy electrode is spaced apart from the first and second sensing electrodes, respectively, by a width in a range of 0.002 mm to 0.05 mm.

8. The touch window of claim 1, wherein at least one of the first and second sensing electrodes or the at least one dummy electrode has a shape of a mesh.

9. The touch window of claim 1, wherein at least one of the second dummy electrode or the third dummy electrode has a bar shape.

10. The touch window of claim 9, wherein the bar shape includes a bent portion.

11. The touch window of claim 1, wherein at least one of the first sensing electrode or the second sensing electrode is formed in a shape of a mesh.

12. The touch window of claim 1, wherein two of the dummy electrodes has a same shape and the other dummy electrode has a different shape.

13. The touch window of claim 1, wherein the second and third dummy electrodes surround the first dummy electrode.

14. The touch window of claim 1, wherein the first dummy electrode, the second dummy electrode, and the third dummy electrode have different widths.

15. The touch window of claim 1, wherein widths of the first dummy electrode, the second dummy electrode, and the third dummy electrode are smaller than widths of the first and second sensing electrodes.

16. The touch window of claim 1, wherein at least one of the first sensing electrode or the second sensing electrode is formed in a shape of a mesh.

17. The touch window of claim 1, wherein an area of each of the dummy electrodes is smaller than an area of the sensing electrode.

18. The touch window of claim 1, wherein an area of one of the dummy electrodes is larger than an area of each of the other two dummy electrodes.

19. The touch window of claim 1, wherein the substrate includes a plurality of layers.

20. The touch window of claim 19, wherein the substrate includes a first substrate and a second substrate.

21. The touch window of claim 19, wherein the plurality of layers comprises a dielectric layer.

22. The touch window of claim 21, wherein the dielectric layer comprises at least one of
an insulator group including a halogen compound of alkali metal or alkali earth metal including LiF, KCl, CaF2, or MgF2, or fused silica including SiO2, or SiNX;
a semiconductor group including InP or InSb;
a transparent oxide including an In compound including ITO or IZO, or a transparent oxide including ZnOx, ZnS, ZnSe, TiOx, WOx, MoOx, or ReOx;
an organic semiconductor group including Alq3, NPB, TAPC, 2TNATA, CBP or Bphen; or
a low-K material including at least one of silsesquioxane or a derivative ((H—SiO3/2)n) thereof, methylsilsesquioxane (CH3-SiO3/2)n), porous silica or porous silica doped with fluorine or carbon atoms, porous zinc oxide (ZnOx), or cyclized-perfluoropolymer (CYTOP).

23. The touch window of claim 21, wherein the substrate includes a substrate layer and the dielectric layer, and wherein a thickness of the dielectric layer is thinner than a thickness of the substrate layer.

24. The touch window of claim 23, wherein the thickness of the dielectric layer is 0.01 times to 0.1 times of the thickness of the substrate layer.

25. A touch window comprising: a substrate; a sensing electrode on the substrate; and a dummy electrode portion provided in the sensing electrode, the dummy electrode portion including at least a first dummy electrode, a second dummy electrode, and a third dummy electrode spaced apart from each other, wherein the substrate includes an active region and an un-active region, the sensing electrode and the dummy electrode portion are provided on the active region, and an area of the dummy electrode portion is 50% to 60% based on a whole area of the active region, and wherein the sensing electrode and the dummy electrode portion are provided directly on a same surface of the substrate.

26. The touch window of claim 25, wherein an area of the sensing electrode is 40% to 50% based on the whole area of the active region.

27. The touch window of claim 26, wherein the active region includes an exposure region in which the sensing electrode is spaced apart from the dummy electrode portion, and an area of the exposure region is 5% to 10% based on the whole area of the active region.

28. A touch window comprising:
a substrate;
a dielectric layer provided over the substrate
first and second sensing electrodes over the dielectric layer, the first and second sensing electrodes spaced apart from each other; and
a dummy electrode provided between the first and second sensing electrodes, wherein the dummy electrode includes a first dummy electrode, a second dummy electrode, and a third dummy electrode spaced apart from each other,
wherein at least one of the first or second sensing electrodes are formed integrally,
wherein the first dummy electrode is provided between the second dummy electrode and third dummy electrode, and
wherein the first sensing electrode, the second sensing electrode and the dummy electrode are provided directly on a same surface of the dielectric layer.

* * * * *